United States Patent
Hoyt

(10) Patent No.: US 7,614,178 B2
(45) Date of Patent: Nov. 10, 2009

(54) RESONATING JIG HEAD

(76) Inventor: Rex Harrison Hoyt, 817 N. Pearl St., Rockport, TX (US) 78382

( * ) Notice: Subject to any disclaimer, the term of this patent is extended or adjusted under 35 U.S.C. 154(b) by 0 days.

(21) Appl. No.: 11/855,306

(22) Filed: Sep. 14, 2007

(65) Prior Publication Data

US 2009/0071057 A1 Mar. 19, 2009

(51) Int. Cl.
*A01K 85/01* (2006.01)
*A01K 85/00* (2006.01)
(52) U.S. Cl. .................. 43/42.31; 43/42.39; 43/44.8
(58) Field of Classification Search ............... 43/42.31, 43/42.39, 42.24, 44.2, 44.8
See application file for complete search history.

(56) References Cited

U.S. PATENT DOCUMENTS

| | | | | | |
|---|---|---|---|---|---|
| 1,878,015 | A | * | 9/1932 | Steffensen | 43/42.39 |
| 2,575,797 | A | * | 11/1951 | Corsi | 43/42.39 |
| 2,817,922 | A | * | 12/1957 | Takeshita | 43/42.39 |
| 2,909,863 | A | * | 10/1959 | Rector et al. | 43/42.31 |
| 3,191,336 | A | * | 6/1965 | Cordell, Jr. | 43/42.24 |
| 3,359,674 | A | * | 12/1967 | Strumor | 43/42.39 |
| 3,367,060 | A | * | 2/1968 | Abercrombie | 43/42.33 |
| 3,483,651 | A | * | 12/1969 | Borger | 43/42.39 |
| 3,497,987 | A | * | 3/1970 | Perrin | 43/42.39 |
| 3,514,358 | A | * | 5/1970 | Barton et al. | 43/42.53 |
| 3,611,614 | A | * | 10/1971 | Ward | 43/42.39 |
| 3,802,115 | A | * | 4/1974 | Auten et al. | 43/42.31 |
| 3,803,747 | A | * | 4/1974 | Cartwright | 43/42.28 |
| 3,848,353 | A | * | 11/1974 | McClellan | 43/42.31 |
| 3,854,233 | A | * | 12/1974 | Browning, III | 43/42.31 |
| 3,868,784 | A | * | 3/1975 | Sabol | 43/42.39 |
| 3,877,168 | A | * | 4/1975 | Stevens | 43/42.31 |
| 3,908,298 | A | * | 9/1975 | Strader | 43/42.31 |
| 3,909,974 | A | * | 10/1975 | Kent | 43/42.31 |
| 3,935,660 | A | * | 2/1976 | Plew | 43/42.31 |
| 3,947,989 | A | * | 4/1976 | Bart | 43/42.31 |
| 3,959,060 | A | * | 5/1976 | Jones | 43/42.39 |
| 3,988,851 | A | * | 11/1976 | Sacharnoski, Sr. | 43/42.31 |
| 4,008,539 | A | * | 2/1977 | Gardner | 43/42.31 |
| 4,015,363 | A | * | 4/1977 | Sedlak | 43/42.31 |
| 4,045,903 | A | * | 9/1977 | Parker | 43/42.31 |
| 4,054,004 | A | * | 10/1977 | Schott | 43/42.31 |
| 4,123,870 | A | * | 11/1978 | Wiskirchen | 43/42.39 |
| 4,219,956 | A | * | 9/1980 | Hedman | 43/42.39 |
| 4,334,381 | A | * | 6/1982 | Carver et al. | 43/42.29 |
| 4,367,607 | A | * | 1/1983 | Hedman | 43/44.8 |

(Continued)

FOREIGN PATENT DOCUMENTS

GB 2340370 A * 2/2000

(Continued)

OTHER PUBLICATIONS

JR's Tackle, Rattle Jigs, Description of product, http://www.jrstackle.com/rattlejigs.html, downloaded Dec. 11, 2007.

*Primary Examiner*—Darren W Ark
(74) *Attorney, Agent, or Firm*—Patterson & Sheridan, LLP

(57) ABSTRACT

Embodiments of the invention generally relate to a lead head jig having a rattle. In one embodiment, a lead head jig includes a fish hook passing through a lead casting, and a rattle secured to the hook by the casting in cantilevered orientation.

13 Claims, 5 Drawing Sheets

U.S. PATENT DOCUMENTS

| | | | | |
|---|---|---|---|---|
| 4,468,881 A * | 9/1984 | Gordon, III | | 43/42.31 |
| 4,653,212 A * | 3/1987 | Pixton | | 43/42.39 |
| 4,712,326 A * | 12/1987 | Hoover et al. | | 43/42.31 |
| 4,713,907 A * | 12/1987 | Dudeck | | 43/42.39 |
| 4,738,047 A * | 4/1988 | Ryan | | 43/42.39 |
| 4,747,228 A * | 5/1988 | Giovengo, Jr. | | 43/42.31 |
| 4,785,572 A * | 11/1988 | Crumley | | 43/42.39 |
| 4,791,750 A * | 12/1988 | Gammill | | 43/42.31 |
| 4,819,366 A * | 4/1989 | Manno | | 43/42.39 |
| 4,858,367 A * | 8/1989 | Rabideau | | 43/42.39 |
| 4,907,364 A * | 3/1990 | Hedman | | 43/42.39 |
| 4,930,247 A * | 6/1990 | Dubois | | 43/42.31 |
| 4,945,669 A * | 8/1990 | Webel | | 43/42.39 |
| 4,969,287 A * | 11/1990 | Johnson | | 43/42.31 |
| 5,001,856 A * | 3/1991 | Gentry | | 43/42.31 |
| 5,018,297 A * | 5/1991 | Kennedy, Jr. | | 43/42.31 |
| 5,024,019 A * | 6/1991 | Rust et al. | | 43/42.31 |
| 5,025,586 A * | 6/1991 | Pixton | | 43/42.39 |
| 5,038,513 A * | 8/1991 | Hardin | | 43/42.31 |
| 5,070,639 A * | 12/1991 | Pippert | | 43/42.39 |
| 5,081,786 A * | 1/1992 | Cobb | | 43/44.81 |
| 5,092,073 A * | 3/1992 | Kaecker | | 43/42.39 |
| 5,119,581 A * | 6/1992 | Rudolph | | 43/42.39 |
| 5,121,568 A * | 6/1992 | Lindmeyer | | 43/42.31 |
| 5,134,801 A * | 8/1992 | Davey | | 43/42.39 |
| 5,144,765 A * | 9/1992 | Keeton | | 43/42.31 |
| 5,152,094 A * | 10/1992 | Strickland | | 43/42.39 |
| 5,230,178 A * | 7/1993 | Dillard | | 43/42.31 |
| 5,335,443 A * | 8/1994 | Grigsby, Jr. | | 43/44.81 |
| 5,355,613 A * | 10/1994 | Kechriotis | | 43/42.22 |
| 5,381,622 A * | 1/1995 | Tregre | | 43/42.31 |
| 5,396,728 A * | 3/1995 | Weber | | 43/42.39 |
| 5,426,886 A * | 6/1995 | Stanley | | 43/42.31 |
| 5,428,919 A * | 7/1995 | Enomoto | | 43/42.39 |
| D362,486 S * | 9/1995 | Short et al. | | D22/126 |
| D363,337 S * | 10/1995 | Gentry | | D22/128 |
| 5,456,040 A * | 10/1995 | Dickens | | 43/42.39 |
| 5,461,819 A * | 10/1995 | Shindledecker | | 43/42.39 |
| 5,499,471 A * | 3/1996 | Foutch et al. | | 43/42.31 |
| 5,517,782 A * | 5/1996 | Link et al. | | 43/42.31 |
| 5,524,378 A * | 6/1996 | Hood | | 43/42.31 |
| 5,524,379 A * | 6/1996 | Hood | | 43/42.31 |
| 5,537,775 A * | 7/1996 | Crumrine | | 43/42.39 |
| 5,551,185 A * | 9/1996 | Reed | | 43/42.31 |
| 5,588,247 A * | 12/1996 | Wicht | | 43/42.31 |
| D388,495 S * | 12/1997 | Gentry | | D22/128 |
| 5,709,047 A * | 1/1998 | Link | | 43/42.31 |
| 5,784,827 A * | 7/1998 | Jimenez et al. | | 43/44.8 |
| 5,822,914 A * | 10/1998 | Tadych | | 43/42.39 |
| 5,832,655 A * | 11/1998 | Crumrine | | 43/42.39 |
| 5,870,850 A * | 2/1999 | Gramse, Jr. | | 43/42.31 |
| 5,890,317 A * | 4/1999 | Hollomon | | 43/42.31 |
| 5,899,015 A * | 5/1999 | Link | | 43/42.39 |
| 5,946,847 A * | 9/1999 | North | | 43/42.31 |
| 5,960,580 A * | 10/1999 | Link | | 43/42.53 |
| 6,006,468 A * | 12/1999 | Hnizdor | | 43/44.83 |
| 6,082,038 A * | 7/2000 | Link | | 43/42.31 |
| 6,199,312 B1 * | 3/2001 | Link | | 43/42.31 |
| 6,233,863 B1 * | 5/2001 | Dotson | | 43/42.39 |
| 6,240,672 B1 * | 6/2001 | Huppert | | 43/42.39 |
| 6,266,916 B1 * | 7/2001 | Dugan | | 43/42.39 |
| 6,510,646 B1 * | 1/2003 | Kechriotis | | 43/42.31 |
| 6,601,336 B1 * | 8/2003 | Link | | 43/42.13 |
| 6,651,376 B1 * | 11/2003 | Link | | 43/42.31 |
| 6,772,553 B2 * | 8/2004 | Phillips et al. | | 43/42.39 |
| 6,836,996 B1 * | 1/2005 | Huppert | | 43/42.39 |
| 6,898,894 B1 * | 5/2005 | Anderson | | 43/42.39 |
| 6,978,571 B1 * | 12/2005 | Nemire | | 43/42.31 |
| 7,107,717 B2 * | 9/2006 | Pelegrin | | 43/42.24 |
| 7,140,146 B2 * | 11/2006 | Gill | | 43/42.39 |
| 7,140,147 B2 * | 11/2006 | Wacha | | 43/42.39 |
| 7,216,455 B2 * | 5/2007 | Becker | | 43/42.39 |
| 7,260,913 B2 * | 8/2007 | Becker | | 43/42.39 |
| 2004/0107628 A1 * | 6/2004 | Mueller | | 43/42.39 |
| 2007/0044368 A1 * | 3/2007 | Duckett | | 43/42.39 |
| 2007/0107295 A1 * | 5/2007 | Kaptis | | 43/42.39 |
| 2007/0107296 A1 * | 5/2007 | Hollomon | | 43/42.31 |
| 2008/0010893 A1 * | 1/2008 | Polachek | | 43/42.39 |
| 2008/0155883 A1 * | 7/2008 | Corbitt | | 43/42.31 |
| 2008/0236022 A1 * | 10/2008 | Harrell | | 43/42.39 |
| 2009/0084021 A1 * | 4/2009 | Bialobrzeski et al. | | 43/42.31 |

FOREIGN PATENT DOCUMENTS

| | | | |
|---|---|---|---|
| JP | 01128739 A | * | 5/1989 |
| JP | 03004726 A | * | 1/1991 |
| JP | 2005341826 A | * | 12/2005 |
| JP | 2008092864 A | * | 4/2008 |
| WO | WO 9419936 A1 | * | 9/1994 |

* cited by examiner

RESONATING JIG HEAD

BACKGROUND OF THE DISCLOSURE

1. Field of the Invention

The embodiments of the invention generally relate to a jig head incorporating a rattle.

2. Description of the Background Art

Lead-head jigs are commonly used for both fresh water and salt water fishing. A lead-head jig generally includes a hook having a molded or cast lead section cast around a hook near the eye of the hook. The jig is typically dressed with a fish attracting member, such as a tube, bucktail, feather or plastic body, or may be used with a strip or natural bait. Some lead-head jigs have rattles attached thereto to further attract fish to the jig. Typically, the rattler is loosely attached to the jig, or may be affixed to the jig utilizing an adhesive. In some designs, the rattle may be fully encapsulated in a pocket formed in the lead portion of the jig. Although the fully encapsulated rattle is firmly secured to the jig by the lead, soft lead is a poor conductor of vibrations, thereby diminishing the effectiveness of the rattle. Adhesives used to affix the rattle to the jig also have the same detrimental dampening effects.

Therefore, there is a need for an improved lead-head jig having a rattle having improved transmittance of the rattles vibration into the surrounding environment.

SUMMARY OF THE INVENTION

Embodiments of the invention generally relate to a lead head jig having a rattle. In one embodiment, a lead head jig includes a fish hook passing through a lead casting, and a rattle secured to the hook by the casting in cantilevered orientation.

In another embodiment, a lead head jig includes a fish hook passing through a lead casting and a rattle. The rattle comprises an elongated hollow glass member and at least one ball disposed within the hollow glass member. The elongated hollow glass member includes an outwardly extending flange that is surrounded by the casting.

In another embodiment, a lead head jig includes a fish hook passing through a lead casting, a wire retainer, an elongated hollow glass member and at least one ball free to move within the hollow glass member. The elongated hollow glass member has a length comprising a first short portion and a long second portion. The first portion has a flange extending therefrom which is encased by the casting. The second portion extends from the casting in cantilevered orientation substantially parallel to a shaft of the hook. The wire retainer is coupled to the casting and has a retaining hook. The retaining hook is adjustable in planar orientation relative to a plane of a bend of the fish hook.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
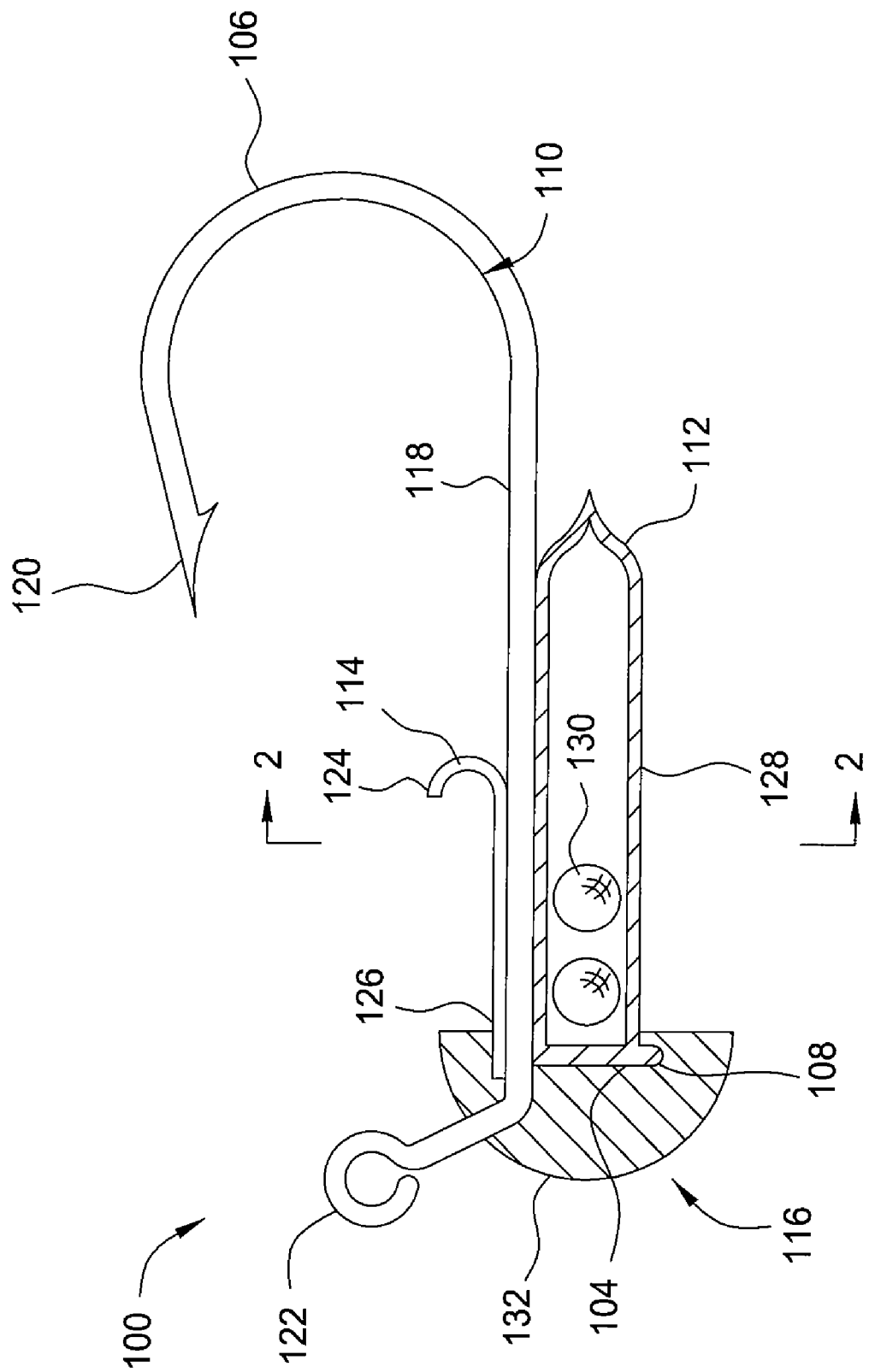
FIG. 1 is a cross-sectional view of one embodiment of a lead-head jig having a rattle of the present invention.

FIG. 1 is one embodiment of a lead-head jig 100. Lead-head jig 100 generally includes a rattle 112 secured to a hook 110 by a lead casting 116. The lead casting 116 substantially encapsulates only an end portion 104 of the rattle 112, thereby holding the rattle 112 in very close proximity and/or in close contact with the hook 110 as further described below. The lead casting 116 includes a head 132 that provides weight to the jig 100. The head 132 may be cast into a variety of shapes, such as round, oval, fish-head or other desirable geometric form.

The hook 110 is of a style suitable for jig fabrication, and may be fabricated from stainless or carbon steel. The hook 110 generally includes a barbed end 120, a bend 106, a shank 118 and an eye 122. The eye 122 may be offset, as shown in FIG. 1, to accommodate different styles of the jig head 132. The style of the hook 110 is generally selected such that the shank 118 is at least as long as the rattle 112.

The rattle 112 generally includes an elongated hollow body 128 that houses one or more balls 130. The hollow body 128 may be a cylindrical or other shaped tube having ends sufficiently closed to retain the balls 130 within the body 128. In one embodiment, the ends of the hollow body 128 are watertight to prevent water from entering the hollow body 128 when the jig 100 is in use.

The hollow body 128 may be fabricated from a metal or crystalline material suitable for producing vibrations when struck by the balls 130. In the embodiment depicted in FIG. 1, the hollow body 128 is fabricated from a brass, glass or quartz material.

The hollow body 128 is retained in a cantilevered orientation from the casting 116. In one embodiment, the rattle 112 is maintained in a substantially parallel orientation to the shank 118 of the hook 110. As only the end 104 of body 128 is encased by the casting 116, the majority of the body 128 is free to vibrate. Because substantially no lead (other than flash from the casting process) or other dampening material is present between the shank 118 and body 128, the hook 110 resonates the vibrations of the rattle 112 such that the rattle of the jig 100 is louder than that of the free rattle itself. Accordingly, the jig 100 transmits substantially more intense vibrations into the water as compared to conventional designs which either bond the hook to the rattle using adhesives or separately encapsulate the hook and rattle in different pockets within the lead casting.

In one embodiment, the hollow body 128 and shank 118 of the hook 110 have parallel centerlines. The outer wall of the hollow body 128 may be substantially continuous contact with the shank 118 of the hook 110 along its complete length, resulting in a large surface-to-surface area for vibration transmission directly between the rattle 112 and the hook 110. In other embodiments, the shaft 118 and body 128 may have a spaced-apart relationship.

The rattle 112 includes a flange 108 at the end 104 of the rattle 112 closest to the eye 122 of the hook 110. The flange 108 functions to lock the end 104 of the rattle 112 within the lead casting 116.

In one embodiment, the lead casting 116 is comprised of a lead composition containing at least 5 percent Antimony. Such high Antimony content causes the lead casting 116 to have high shrinkage during cooling, thereby firmly gripping flange 108 and securely retaining the hollow body 128 to the jig 100. Moreover, the high Antimony content of the lead casting 116 reduces the viscosity of the molten lead, thereby facilitating void-free casting and freely flowing around the flange 108 of the rattle 112, resulting in a more secure attachment of the rattle 112 to the lead casting 116. Additionally, the high flow lead composition produces a more aesthetically appealing product. In one embodiment, the lead casting 116 comprises 6 percent Antimony and 2 percent tin.

Figure 3A:
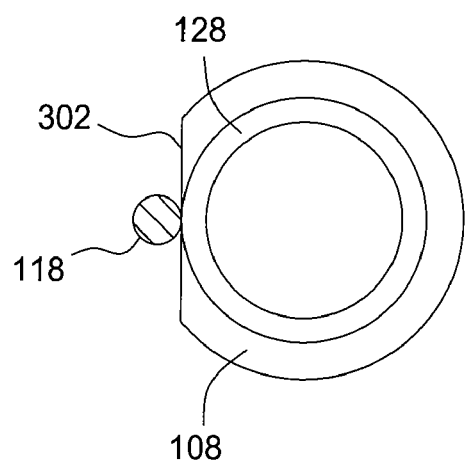
FIG. 3A is a sectional view of the lead-head jig of FIG. 1 with the casting removed.
Figure 3B:
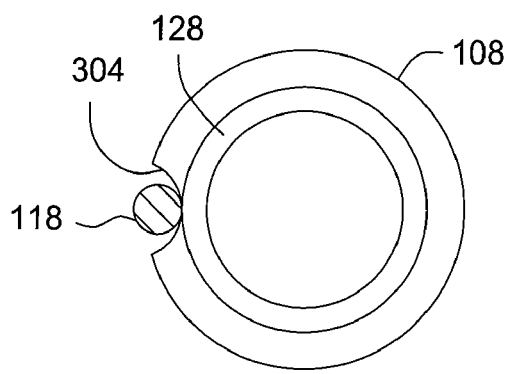
FIG. 3B is a sectional view of the lead-head jig of FIG. 1 having another embodiment of a rattle flange.

Referring additionally to FIG. 3A, the lip 108 of the rattle 112 may include a flat 302, as shown in FIG. 3A, or a notch 304, as shown in FIG. 3B. The flat 302 or notch 304 allows the outer wall of the body 128 to be secured in a substantially parallel and close proximity to the shaft 118 of the hook 110, which provides better transmission of vibration between the rattle 112 and hook 110.

Figure 2:
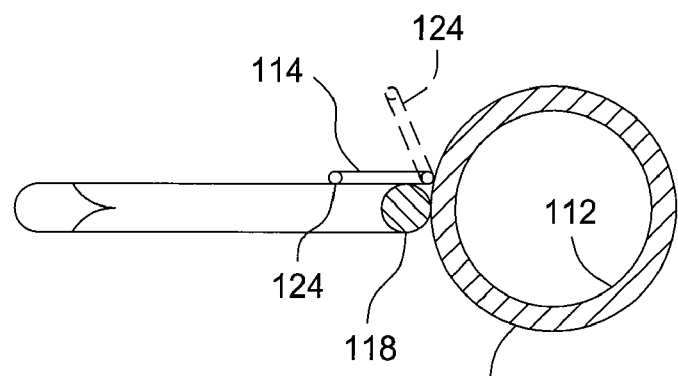
FIG. 2 is a sectional view of the lead-head jig of FIG. 1 taken along section line 2-2.

Referring back to FIG. 1, the jig 100 may also include a retainer 114. The retainer 114 extends from the casting 116 toward the hook 120 and is typically utilized to secure a fish attractorant, such as bait, plastic bodies and the like, to the jig 100. The retainer 114 may be positioned on the side of the shank 118 opposite the rattle 112, as shown in FIG. 1, in the cease between the shank 118 and the rattle 112, as shown in FIG. 2, or other suitable location.

In the embodiment depicted in FIG. 1, the retainer 114 includes a shaft 126 and a hook 124. The end of the shaft 126 is generally encapsulated within the lead casting 116, while the hook 124 extends toward the bend 106 of the hook 110 and curves back toward the eye 122, so that hook 124 may engage the attractorant and secure the attractorant to the jig, as shown in FIG. 4.

Figure 4A:
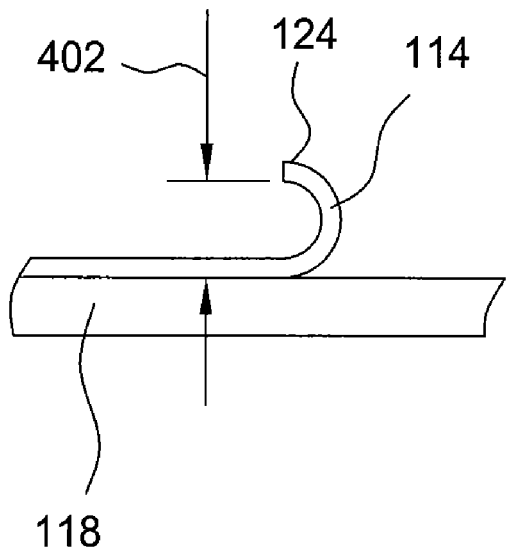
FIGS. 4A-B depict partial side views of the lead-head jig of FIG. 1 with illustrating adjustment of a retainer.
Figure 4B:
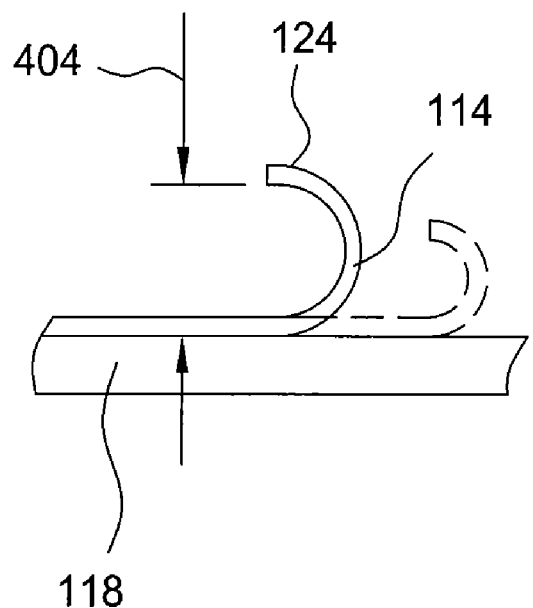

The retainer 114 is typically generally made of a stainless wire, for example, 22-gauge stainless steel. The length of the retainer 114 is relatively short compared to the fish hook 10, and thus, cannot function as a conventional weed guard. Referring additionally to FIGS. 4A and 4B, the configuration of the hook 124 of the retainer 114 may be adjusted in the field utilizing pliers or other device so that the gap between the hook 124 and the shaft 126 may be adjusted. For example, the hook 124 having a small gap 402 selected to secure thin wall plastic bodies, is shown in FIG. 4A. The hook 124 of the retainer 114 may be bent or reformed using a hand tool or other suitable object from the orientation shown in FIG. 4A to form a larger gap 404, as shown in FIG. 4B, which is more suitable for securing plastic bodies having a thicker wall. The flexibility of the retainer 114 enables plastic bodies having different thicknesses to be readily secured to the jig 100. Additionally, as the retainer 114 is fabricated from a flexible wire, the hook 124 may be turned from an orientation substantially parallel a plane of the hook bend 106 to a planar orientation offset from the plane of the bend 106, as shown in phantom in FIG. 2. This allows plastic bodies which have been torn after fish strikes to be utilized additional times as a different jig to body attachment point may be utilized without changing the plastic bodies position or orientation on the jig 100, which cannot be accomplished with conventional, fixed barb jig designs.

Figure 5:
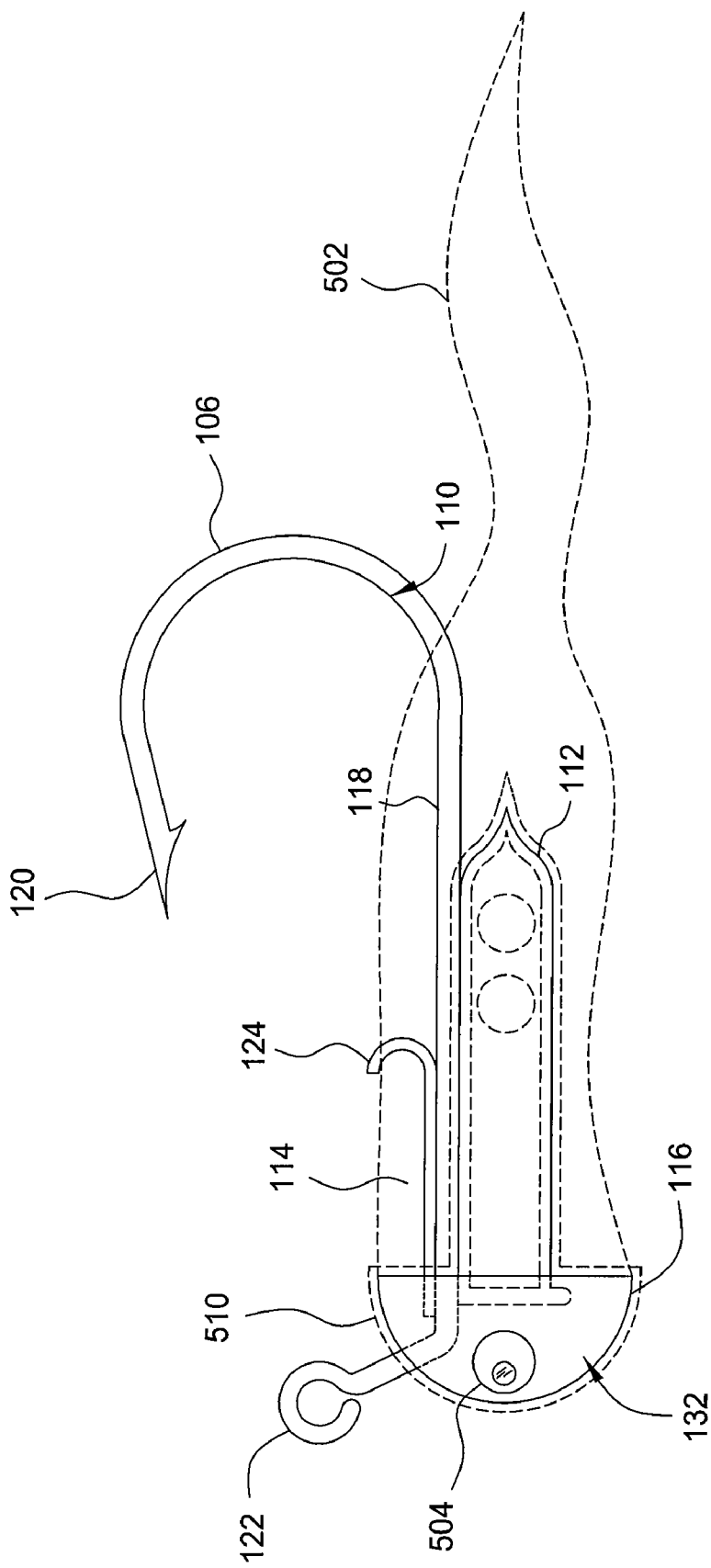
FIG. 5 is a side view of the lead-head jig of FIG. 1 having a plastic body (shown in phantom) disposed thereon.
Figure 6:
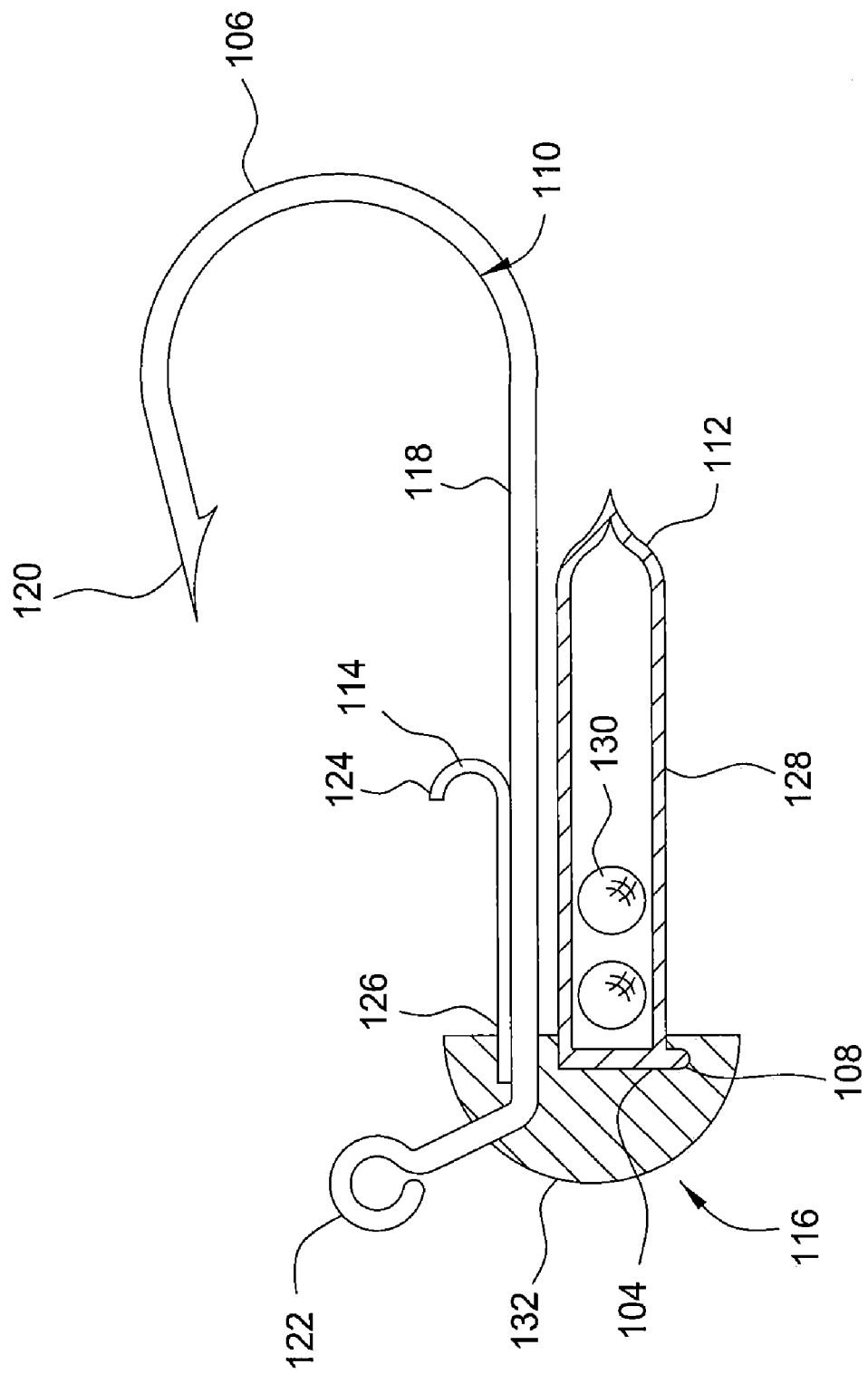
FIG. 6 is a side view of another embodiment of a lead-head jig.

FIG. 5 is a side view of the lead-head jig having a plastic body 502 (shown in phantom) disposed thereon. The lead-head jig includes a flexible epoxy 510 (shown in phantom) coating the casting 116 and rattle 112. Light reflecting eyes 504 are coupled to the casting 116, wherein the eyes 504 are coated by the epoxy 510.

While the foregoing is directed to embodiments of the present invention, other and further embodiments of the invention may be devised without departing from the basic scope thereof, and the scope thereof is determined by the claims that follow.

What is claimed is:

1. A lead head jig comprising:
   a lead casting;
   a fish hook passing through the lead casting; and
   a rattle having a flange extending radially outward from an end of an elongated hollow glass body, the flange having a flat or a notch facing the hook that allows the glass body to be disposed in contact with the shank of the hook in a substantially parallel orientation, the flange of the rattle encased by the casting such that the hollow glass body extends from the casting in a cantilevered orientation, and at least one ball disposed within the elongated hollow glass body.

2. The jig of claim 1, wherein the flat faces the shank of the hook.

3. The jig of claim 1, wherein the notch accommodates the shank of the hook therein.

4. The jig of claim 1 further comprising:
   a flexible retainer having a first end embedded in the casting and a second end terminating in a hook, the retainer separated from the rattle by the shank of the hook.

5. The jig of claim 4, wherein the retainer further comprises:
   a stainless wire.

6. The jig of claim 5, wherein a gap of the retainer hook is adjustable.

7. The jig of claim 1 further comprising:
   a flexible epoxy coating the casting and rattle.

8. The jig of claim 7 further comprising:
   light reflecting eyes coupled to the casting, wherein the eyes are coated by the epoxy.

9. A lead head jig comprising:
   a lead casting;
   a fish hook passing through the lead casting; and
   a rattle comprising:
      an elongated hollow glass member contacting the hook in a parallel orientation, the hollow glass member having a first portion disposed in the casting and a second portion extending from the casting in cantilevered orientation;
      a flexible member having a first end embedded in the casting and a second end terminating in a hook, the flexible retainer separated from the rattle by a shank of the fish hook;
      at least one ball disposed within the hollow glass member; and
      a flange extending outward from the first portion of the hollow glass member and surrounded by the casting, the flange comprising a flat or a notch which accommodates the shank of the hook therein.

10. The jig of claim 9, wherein a gap of the retainer hook is adjustable.

11. The jig of claim 9 further comprising:
a flexible epoxy coating the casting and rattle.

12. The jig of claim 9 further comprising:
light reflecting eyes coupled to the casting.

13. A lead head jig comprising:
a lead casting;
a fish hook passing through the lead casting;
an elongated hollow glass member having a length comprising a first short portion and a long second portion, the first portion having a flange extending radially therefrom, the first portion and the flange encased by the casting, the second portion extending from the casting in cantilevered orientation substantially parallel to a shank of the hook, the flange comprising a flat or a notch which accommodates the shank of the hook therein;
at least one ball free to move within the hollow glass member; and
a wire retainer coupled to the casting and including a retaining hook, the retaining hook adjustable in planar orientation relative to a plane of a bend of the fish hook, the wire retainer separated from the second portion of the glass member by the shank of the fish hook.

* * * * *